United States Patent
Luo et al.

(10) Patent No.: US 12,265,676 B2
(45) Date of Patent: Apr. 1, 2025

(54) TOUCH SAMPLING CONTROL MODULE AND METHOD, AND DISPLAY TOUCH DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ping Luo, Beijing (CN); Guiyu Zhang, Beijing (CN); Zhiqiang Wang, Beijing (CN); Hang Min, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/553,556

(22) PCT Filed: Nov. 30, 2022

(86) PCT No.: PCT/CN2022/135515
§ 371 (c)(1),
(2) Date: Sep. 30, 2023

(87) PCT Pub. No.: WO2024/113240
PCT Pub. Date: Jun. 6, 2024

(65) Prior Publication Data
US 2025/0077020 A1    Mar. 6, 2025

(51) Int. Cl.
*G06F 3/041*    (2006.01)

(52) U.S. Cl.
CPC .............................. *G06F 3/04166* (2019.05)

(58) Field of Classification Search
CPC .................................................. G06F 3/04166
See application file for complete search history.

(56) References Cited

U.S. PATENT DOCUMENTS 10,042,470 B2 *   8/2018   Shin ...................... G06F 3/0412
11,455,059 B1 *   9/2022   Malkin ............... G06F 3/04166
(Continued)

FOREIGN PATENT DOCUMENTS

CN    102221934 A    10/2011
CN    102402331 A     4/2012
(Continued)

*Primary Examiner* — Benyam Ketema
(74) *Attorney, Agent, or Firm* — BROOKS KUSHMAN P.C.

(57) ABSTRACT

A touch sampling control module, a touch sampling control module method, and a display touch device. The touch sampling control module includes a touch sampling flag generation circuitry and a sampling time control circuitry. The touch sampling flag generation circuitry is configured to generate a touch sampling flag in accordance with a fluctuation time point of a data voltage applied to a touch display panel. The sampling time control circuitry is configured to control a touch sampling time in accordance with the touch sampling flag, so that the touch sampling time is different from the fluctuation time point of the data voltage. The data voltage fluctuates when an absolute value of a voltage change of the data voltage is larger than a voltage change threshold.

20 Claims, 6 Drawing Sheets

(56) References Cited

U.S. PATENT DOCUMENTS

| | | | |
|---|---|---|---|
| 12,159,007 B1* | 12/2024 | Huang | G06F 3/04182 |
| 12,175,041 B2* | 12/2024 | Park | G06F 3/04184 |
| 2012/0056834 A1* | 3/2012 | Kim | G06F 3/04184 |
| | | | 345/173 |
| 2012/0293429 A1 | 11/2012 | Chuang | |
| 2013/0271420 A1 | 10/2013 | Chen et al. | |
| 2014/0225874 A1* | 8/2014 | Snedeker | G06F 3/041 |
| | | | 345/178 |
| 2018/0335861 A1 | 11/2018 | Wu | |
| 2019/0004666 A1 | 1/2019 | Jiang et al. | |
| 2020/0387283 A1* | 12/2020 | Jiang | G01D 5/2417 |
| 2021/0019019 A1 | 1/2021 | Zhang et al. | |
| 2021/0397327 A1* | 12/2021 | Lee | G06F 3/0412 |
| 2022/0206660 A1* | 6/2022 | Kang | G09G 3/2092 |
| 2023/0147349 A1* | 5/2023 | Park | G06F 3/04166 |
| | | | 345/174 |

FOREIGN PATENT DOCUMENTS

| | | | | |
|---|---|---|---|---|
| CN | 103376961 A | 10/2013 | | |
| CN | 103914166 A | 7/2014 | | |
| CN | 104238836 A | 12/2014 | | |
| CN | 105094475 A | 11/2015 | | |
| CN | 108958518 A | 12/2018 | | |
| CN | 110462571 A | 11/2019 | | |
| CN | 110494828 A | 11/2019 | | |
| CN | 112000248 A | 11/2020 | | |
| CN | 112905047 A | 6/2021 | | |
| CN | 113485571 A | 10/2021 | | |
| CN | 113805721 A | 12/2021 | | |
| CN | 114217703 A | 3/2022 | | |
| CN | 114327125 A | 4/2022 | | |
| EP | 4012539 A1 * | 6/2022 | | G06F 3/0412 |

\* cited by examiner

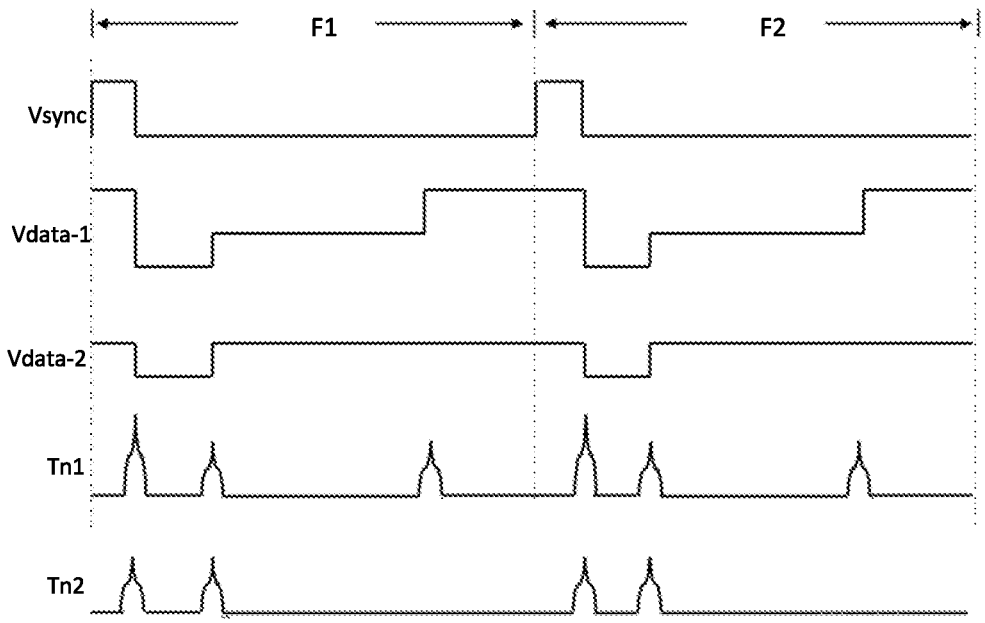

Fig. 10 generating, by the touch sampling flag generation circuitry, a touch sampling flag in accordance with a fluctuation time point of a data voltage applied to the touch display panel — S91 controlling, by the sampling time control circuitry, a touch sampling time in accordance with the touch sampling flag so that the touch sampling time is different from the fluctuation time point of the data voltage — S92

Fig. 11

TOUCH SAMPLING CONTROL MODULE AND METHOD, AND DISPLAY TOUCH DEVICE

CROSS-REFERENCE TO RELATED APPLICATION

This application is the U.S. national phase of PCT Application No. PCT/CN2022/135515 filed on Nov. 30, 2022, which is incorporated herein by reference in its entirety.

TECHNICAL FIELD

The present disclosure relates to the field of touch technology, in particular to a touch sampling control module, a touch sampling control method, and a display touch device.

BACKGROUND

Organic Light-Emitting Diode (OLED) display panel is used in a foldable or curlable form due to its flexibility. In order to be further lightened and thinned, a touch layer is directly formed on a Thin Film Encapsulation (TFE) for touch display. However, in this way, distances between the touch layer and a cathode of an OLED and between the touch layer and a transistor in a pixel circuitry are reduced, resulting in an excessive coupling capacitance between the cathode of the OLED and the touch layer. During the touch detection, a serious interference is caused by a display operation on a touch operation, and it is impossible to differentiate a touch signal from a noise, so it is impossible to perform a lineation test normally.

SUMMARY

In one aspect, the present disclosure provides in some embodiments a touch sampling control module for a display touch device. The display touch device includes a touch display panel, and the touch sampling control module includes a touch sampling flag generation circuitry and a sampling time control circuitry. The touch sampling flag generation circuitry is configured to generate a touch sampling flag in accordance with a fluctuation time point of a data voltage applied to the touch display panel, the sampling time control circuitry is configured to control a touch sampling time in accordance with the touch sampling flag so that the touch sampling time is different from the fluctuation time point of the data voltage, and the data voltage fluctuates when an absolute value of a voltage change of the data voltage is larger than a voltage change threshold.

In a possible embodiment of the present disclosure, the display touch device further includes a display driving integrated circuitry, the touch sampling flag generation circuitry is configured to receive a data voltage fluctuation indication signal from the display driving integrated circuitry and set the data voltage fluctuation indication signal as the touch sampling flag, and the data voltage fluctuation indication signal indicates the fluctuation time point of the data voltage.

In a possible embodiment of the present disclosure, the display touch device further includes a touch integrated circuitry, and the touch sampling flag generation circuitry and the sampling time control circuitry are integrated in the touch integrated circuitry.

In a possible embodiment of the present disclosure, the display touch device further includes a display driving integrated circuitry, the touch sampling flag generation circuitry includes a conversion sub-circuitry and a clock memory, the conversion sub-circuitry is configured to receive a data voltage fluctuation indication signal from the display driving integrated circuitry, convert the data voltage fluctuation indication signal into a corresponding timing sequence signal and provide the timing sequence signal to the clock memory, the data voltage fluctuation indication signal indicates the fluctuation time point of the data voltage, the clock memory is configured to store therein the timing sequence signal, and the touch sampling flag is the timing sequence signal.

In a possible embodiment of the present disclosure, the display touch device further includes a touch integrated circuitry, and the sampling time control circuitry is integrated in the touch integrated circuitry.

In a possible embodiment of the present disclosure, the data voltage fluctuation indication signal is a frame synchronization signal or a row synchronization signal.

In a possible embodiment of the present disclosure, the touch sampling control module further includes a data voltage application circuitry configured to control the quantity of fluctuations of the data voltage to be smaller than a fluctuation threshold within a display period.

In another aspect, the present disclosure provides in some embodiments a touch sampling control method for a display touch device. The display touch device includes a touch display panel, and a touch sampling control module includes a touch sampling flag generation circuitry and a sampling time control circuitry. The touch sampling control method includes: generating, by the touch sampling flag generation circuitry, a touch sampling flag in accordance with a fluctuation time point of a data voltage applied to the touch display panel; and controlling, by the sampling time control circuitry, a touch sampling time in accordance with the touch sampling flag so that the touch sampling time is different from the fluctuation time point of the data voltage. The data voltage fluctuates when an absolute value of a voltage change of the data voltage is larger than a voltage change threshold.

In a possible embodiment of the present disclosure, the controlling, by the sampling time control circuitry, the touch sampling time in accordance with the touch sampling flag so that the touch sampling time is different from the fluctuation time point of the data voltage, includes controlling, by the sampling time control circuitry, the touch sampling time to be located after the fluctuation time point of the data voltage and controlling a time interval between the touch sampling time and the fluctuation time point of the data voltage to be greater than a time threshold in accordance with the touch sampling flag.

In a possible embodiment of the present disclosure, the controlling, by the sampling time control circuitry, the touch sampling time in accordance with the touch sampling flag so that the touch sampling time is different from the fluctuation time point of the data voltage includes controlling, by the sampling time control circuitry, the touch sampling time to be located before the fluctuation time point of the data voltage and controlling a time interval between the touch sampling time and the fluctuation time point of the data voltage to be greater than a time threshold in accordance with the touch sampling flag.

In a possible embodiment of the present disclosure, the time threshold is Tz/N, where Tz represents one frame, and N represents the total quantity of rows of pixel circuitries in the display touch device.

In a possible embodiment of the present disclosure, the display touch device further includes a display driving integrated circuitry, the generating, by the touch sampling flag generation circuitry, the touch sampling flag in accordance with the fluctuation time point of the data voltage applied to the touch display panel includes receiving, by the touch sampling flag generation circuitry, a data voltage fluctuation indication signal from the display driving integrated circuitry and setting the data voltage fluctuation indication signal as the touch sampling flag, and the data voltage fluctuation indication signal indicates the fluctuation time point of the data voltage.

In a possible embodiment of the present disclosure, the display touch device further includes a display driving integrated circuitry, and the touch sampling flag generation circuitry includes a conversion sub-circuitry and a clock memory. The generating, by the touch sampling flag generation circuitry, the touch sampling flag in accordance with the fluctuation time point of the data voltage applied to the touch display panel includes receiving, by the conversion sub-circuitry, a data voltage fluctuation indication signal from the display driving integrated circuitry, converting the data voltage fluctuation indication signal into a corresponding timing sequence signal, and providing the timing sequence signal to the clock memory, the data voltage fluctuation indication signal indicates the fluctuation time point of the data voltage, the clock memory is configured to store therein the timing sequence signal, and the touch sampling flag is the timing sequence signal.

In a possible embodiment of the present disclosure, the data voltage fluctuation indication signal is a frame synchronization signal or a row synchronization signal.

In a possible embodiment of the present disclosure, the touch sampling control module further includes a data voltage application circuitry, and the touch sampling control method further includes controlling, by the data voltage application circuitry, the quantity of fluctuations of the data voltage to be smaller than a fluctuation threshold within a display period.

In yet another aspect, the present disclosure provides in some embodiments a display touch device including the touch sampling control module.

In a possible embodiment of the present disclosure, the display touch device further includes a touch display panel and a data voltage application circuitry, the data voltage application circuitry is configured to apply a data voltage to a pixel circuitry in the touch display panel, and the touch sampling flag generation circuitry is electrically coupled to the data voltage application circuitry and configured to generate a touch sampling flag in accordance with a fluctuation time point of the data voltage.

In a possible embodiment of the present disclosure, the display touch device includes a source electrode driver, and the data voltage application circuitry is integrated in the source electrode driver.

In a possible embodiment of the present disclosure, the display touch device further includes a display driving integrated circuitry electrically coupled to the data voltage application circuitry and configured to generate a data voltage fluctuation indication signal in accordance with the data voltage applied by the data voltage application circuitry and provide the data voltage fluctuation indication signal to the touch sampling flag generation circuitry, the data voltage fluctuation indication signal indicates the fluctuation time point of the data voltage, and the touch sampling flag generation circuitry is configured to set the data voltage fluctuation indication signal as the touch sampling flag.

In a possible embodiment of the present disclosure, the display touch device further includes a display driving integrated circuitry, the touch sampling flag generation circuitry includes a conversion sub-circuitry and a clock memory, the display driving integrated circuitry is electrically coupled to the data voltage application circuitry and configured to generate a data voltage fluctuation indication signal in accordance with the data voltage applied by the data voltage application circuitry and provide the data voltage fluctuation indication signal to the conversion sub-circuitry, the conversion sub-circuitry is configured to convert the data voltage fluctuation indication signal into a corresponding timing sequence signal and provide the timing sequence signal to the clock memory, the clock memory is configured to store therein the timing sequence signal, and the touch sampling flag is the timing sequence signal.

BRIEF DESCRIPTION OF THE DRAWINGS

FIG. 10 is another waveform diagram of the data voltage before improvement, the data voltage after improvement, the noise signal before improvement and the noise signal after improvement;

FIG. 11 is a flow chart of a touch sampling control method according to one embodiment of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be Thin Film Transistors (TFTs), field effect transistors (FETs) or any other elements having an identical characteristic. In order to differentiate two electrodes other than a gate electrode from each other, one of the two electrodes is called as first electrode and the other is called as second electrode.

In actual use, the first electrode may be a drain electrode while the second electrode may be a source electrode, or the first electrode may be a source electrode while the second electrode may be a drain electrode.

Figure 1:
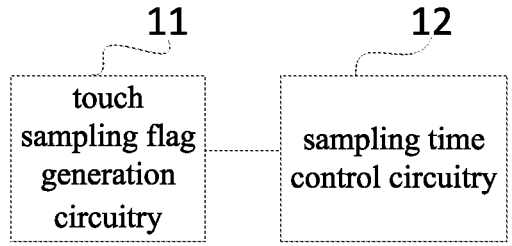
FIG. 1 is a schematic view showing a touch sampling control module according to one embodiment of the present disclosure.

The present disclosure provides in some embodiments a touch sampling control module for a display touch device, and the display touch device includes a touch display panel. As shown in FIG. 1, the touch sampling control module includes a touch sampling flag generation circuitry 11 and a sampling time control circuitry 12. The touch sampling flag generation circuitry 11 is configured to generate a touch sampling flag in accordance with a fluctuation time point of a data voltage applied to the touch display panel. The sampling time control circuitry 12 is electrically coupled to the touch sampling flag generation circuitry 11 and configured to control a touch sampling time in accordance with the touch sampling flag so that the touch sampling time is different from the fluctuation time point of the data voltage. The data voltage fluctuates when an absolute value of a voltage change of the data voltage is larger than a voltage change threshold.

According to the embodiments of the present disclosure, during the operation of the touch sampling control module, the touch sampling flag generation circuitry 11 generates the touch sampling flag in accordance with the fluctuation time point of the data voltage applied to the touch display panel, and the sampling time control circuitry 12 controls the touch sampling time in accordance with the touch sampling flag so that the touch sampling time is different from the fluctuation time point of the data voltage. As a result, it is able to reduce a noise caused when the voltage fluctuation of the data voltage is coupled to a touch sensor, achieve a normal touch operation through differentiating a touch signal from a display noise during the touch driving, and perform the touch sampling with avoiding a large touch noise frequency point, thereby to improve a touch Signal to Noise Ratio (SNR) and meet the requirement on an active stylus application.

In at least one embodiment of the present disclosure, a time interval between the touch sampling time and the fluctuation time point of the data voltage is greater than a scanning time for one row so that the touch sampling time does not overlaps with the fluctuation time point of the data voltage. The scanning time for one row is equal to Tz/N, where Tz represents one frame and N represents the total quantity of rows of pixel circuitries in the display touch device.

In at least one embodiment of the present disclosure, the display touch device further includes a touch unit which is used to in contact with a touch screen of the display touch device. A touch detection module in the display touch device is used to detect a position where the touch unit is in contact with the touch screen. For example, the touch unit includes an active stylus, a reading pen, an electromagnetic pen, a passive stylus. Alternatively, the touch unit is, but not limited to, a finger.

During the implementation, the display touch device includes a touch screen, and a touch operation is made through a touch pen, an electromagnetic pen or a reading pen, apart from a finger. The touch pen includes an active stylus and a passive stylus. The passive stylus is equivalent to a finger, and when it is in contact with the touch screen, a small part of current flows at a touch point into the passive stylus, i.e., a capacitance of an electrode at the touch point changes. The active stylus generates a driving signal to change an electric field at the touch point, so as to change the capacitance of the electrode at the touch point. The touch detection module in the display touch device is used to determine a position of the touch point in accordance with a change in the capacitance of the electrode.

In at least one embodiment of the present disclosure, at the touch sampling time, a touch integrated circuitry (TIC) samples electrical parameters of touch electrodes in the touch display panel so as to obtain the position of the touch point on the touch display panel.

In at least one embodiment of the present disclosure, the fluctuation of the data voltage refers to a situation where the absolute value of the voltage change of the data voltage is greater than the voltage change threshold. For example, the voltage change threshold is, but not limited to, greater than or equal to 0.8 V and smaller than or equal to 1.5 V.

According to the touch sampling control module in the embodiments of the present disclosure, it is able to prevent the occurrence of a large touch noise without adversely affecting a display effect. The touch sampling control module is applied not only to an on-cell display device (where a touch panel function is arranged between a color filter substrate and a polarizer), but also to an in-cell display device (where the touch panel function is integrated into a liquid crystal pixel) and an add-on display device (where a touch device is added on a display panel).

When the touch unit is an active stylus, the touch sampling control module is not constrained by an active stylus protocol, e.g., Microsoft Pen Protocol (MPP) active stylus protocol, HPP active stylus protocol, AES active stylus protocol or Universal Stylus Initiative (USI) active stylus protocol. In addition, the touch sampling control module is not constrained by a refresh rate, and it may be applied to a display device with a refresh rate of 60 Hz, 90 Hz, 120 Hz or 144 Hz.

In at least one embodiment of the present disclosure, the display touch device further includes a display driving integrated circuitry configured to provide a data voltage fluctuation indication signal to the touch sampling flag generation circuitry, and the data voltage fluctuation indication signal indicates the fluctuation time point of the data voltage. The touch sampling flag generation circuitry is configured to set the data voltage fluctuation indication signal as the touch sampling flag.

During the implementation, the display touch device further includes the display driving integrated circuitry for providing the data voltage fluctuation indication signal to the touch sampling flag generation circuitry, and the touch sampling flag generation circuitry sets the data voltage fluctuation indication signal as the touch sampling flag.

For example, the data voltage fluctuation indication signal includes, but not limited to, a frame synchronization signal Vsync or a row synchronization signal Hsync.

Figure 2:
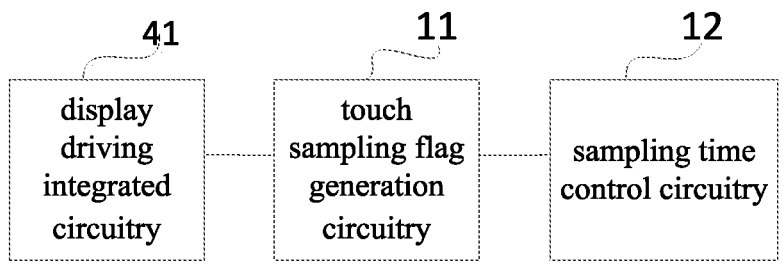
FIG. 2 is another schematic view showing the touch sampling control module according to one embodiment of the present disclosure.

As shown in FIG. 2, in at least one embodiment of the present disclosure, the display touch device further includes a display driving integrated circuitry 41 electrically coupled to the touch sampling flag generation circuitry 11 and configured to provide a data voltage fluctuation indication signal to the touch sampling flag generation circuitry 11, and the data voltage fluctuation indication signal indicates the fluctuation time point of the data voltage. The touch sampling flag generation circuitry 11 is configured to set the data voltage fluctuation indication signal as the touch sampling flag. The sampling time control circuitry 12 is electrically coupled to the touch sampling flag generation circuitry 11 and configured to control the touch sampling time in accordance with the touch sampling flag so that the touch sampling time is different from the fluctuation time point of the data voltage. The data voltage fluctuates when an absolute value of a voltage change of the data voltage is larger than a voltage change threshold.

During the implementation, the display driving integrated circuitry 41 is electrically coupled to the touch sampling flag generation circuitry 11, so as to directly provide the data voltage fluctuation indication signal to the touch sampling flag generation circuitry 11. For example, the data voltage fluctuation indication signal is a frame synchronization signal Vsync or a row synchronization signal Hsync, and the touch sampling flag generation circuitry 11 sets the data voltage fluctuation indication signal as the touch sampling flag.

In a possible embodiment of the present disclosure, the display touch device further includes a touch integrated circuitry, and the touch sampling flag generation circuitry and the sampling time control circuitry are integrated in the touch integrated circuitry.

During the implementation, the display touch device further includes the touch integrated circuitry (TIC, i.e., touch IC), and the touch sampling flag generation circuitry and the sampling time control circuitry are integrated in the touch integrated circuitry.

Figure 3:
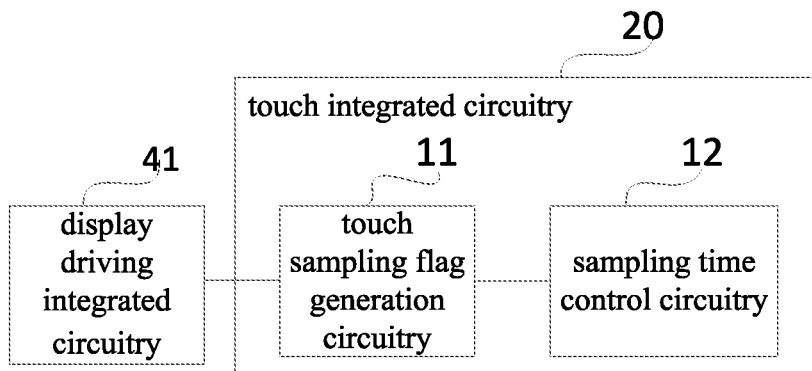
FIG. 3 is yet another schematic view showing the touch sampling control module according to one embodiment of the present disclosure.

As shown in FIG. 3, 20 is the touch integrated circuitry in which the touch sampling flag generation circuitry 11 and the sampling time control circuitry 12 are integrated.

In a possible embodiment of the present disclosure, the display touch device further includes a display driving integrated circuitry, and the touch sampling flag generation circuitry includes a conversion sub-circuitry and a clock memory. The display driving integrated circuitry is configured to provide a data voltage fluctuation indication signal to the conversion sub-circuitry, and the data voltage fluctuation indication signal indicates the fluctuation time point of the data voltage. The conversion sub-circuitry is configured to convert the data voltage fluctuation indication signal into a corresponding timing sequence signal, and provide the timing sequence signal to the clock memory. The clock memory is configured to store therein the timing sequence signal, and the touch sampling flag is the timing sequence signal.

During the implementation, the touch sampling flag generation circuitry includes the conversion sub-circuitry and the clock memory, the conversion sub-circuitry converts the data voltage fluctuation indication signal into the timing sequence signal, the clock memory stores therein the timing sequence signal, and the timing sequence signal is used as the touch sampling flag.

Figure 4:
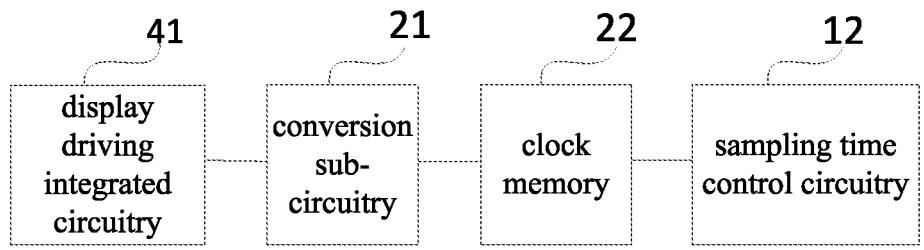
FIG. 4 is still yet another schematic view showing the touch sampling control module according to one embodiment of the present disclosure.

In the embodiments of the present disclosure, the data voltage fluctuation indication signal is directly provided to the TIC as the touch sampling flag. For example, a frame synchronization signal Vsync or a row synchronization signal Hsync in an SDIC (display driving integrated circuitry) is provided to the TIC, and the frame synchronization signal Vsync or the row synchronization signal Hsync is taken as the touch sampling flag. Alternatively, the data voltage fluctuation indication signal is converted into the timing sequence signal, the timing sequence signal is stored in the clock memory, and then the timing sequence signal is provided to the TIC as the touch sampling flag. In this way, a touch sampling frequency point does not overlap with a data voltage fluctuation frequency point, so it is able to prevent the touch detection being adversely affected by the noise caused when the fluctuation of the data voltage is coupled to a touch sensor (which is included in the touch detection module). As shown in FIG. 4, on the basis of FIG. 1, the display touch device further includes a display driving integrated circuitry 41, and the touch sampling flag generation circuitry includes a conversion sub-circuitry 21 and a clock memory 22.

The display driving integrated circuitry 41 is electrically coupled to the conversion sub-circuitry 21 and configured to provide a data voltage fluctuation indication signal to the conversion sub-circuitry 21, and the data voltage fluctuation indication signal indicates the fluctuation time point of the data voltage. The conversion sub-circuitry 21 is electrically coupled to the clock memory 22 and configured to convert the data voltage fluctuation indication signal into a corresponding timing sequence signal and provide the timing sequence signal to the clock memory 22. The clock memory 22 is configured to store therein the timing sequence signal, and the touch sampling flag is the timing sequence signal.

The sampling time control circuitry 12 is electrically coupled to the clock memory 22, and configured to obtain the timing sequence signal from the clock memory 22, and control a touch sampling time in accordance with the timing sequence signal so that the touch sampling time is different from the fluctuation time point of the data voltage.

The data voltage fluctuates when an absolute value of a voltage change of the data voltage is larger than a voltage change threshold. During the implementation, the touch sampling flag generation circuitry includes the conversion sub-circuitry and the clock memory, the conversion sub-circuitry converts the data voltage fluctuation indication signal into the timing sequence signal, the clock memory stores therein the timing sequence signal, and the timing sequence signal is used as the touch sampling flag.

In at least one embodiment of the present disclosure, the timing sequence signal is a clock signal. The timing sequence signal has a rising edge or a falling edge when each gate line in the display touch device is enabled and a pixel circuitry in a corresponding row starts to receive a data voltage from a corresponding data line.

When the data voltage fluctuation indication signal is a row synchronization signal Hsync, the conversion sub-circuitry convert or shift a level of the row synchronization signal Hsync to obtain the timing sequence signal, so that the timing sequence signal indicates a time when the pixel circuitry in each row starts to receive the data voltage from the data line; or when the data voltage fluctuation indication signal is a frame synchronization signal Vsync, the frame synchronization signal Vsync indicates a start time of each frame. Since a time for scanning the pixel circuitry in each row is fixed, the conversion sub-circuitry obtains the timing sequence signal in accordance with the start time of each frame, so that the timing sequence signal has a rising edge or a falling edge when each gate line in the display touch device is enabled and the pixel circuitry in the corresponding row starts to receive the data voltage from the data line.

In at least one embodiment of the present disclosure, the display touch device further includes a touch integrated circuitry, and the sampling time control circuitry is integrated in the touch integrated circuitry.

In a possible embodiment of the present disclosure, the data voltage fluctuation indication signal includes a frame synchronization signal or a row synchronization signal.

The touch sampling control module further includes a data voltage application circuitry configured to control the quantity of fluctuations of the data voltage to be smaller than a fluctuation threshold within a display period.

In the embodiments of the present disclosure, the quantity of fluctuations of the data voltage is reduced so as to reduce the noise caused when the fluctuation of the data voltage is coupled to the touch sensor.

Figure 5:
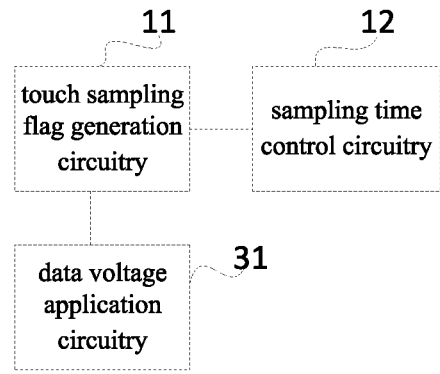
FIG. 5 is still yet another schematic view showing the touch sampling control module according to one embodiment of the present disclosure.

As shown in FIG. 5, on the basis of FIG. 1, the touch sampling control module further includes a data voltage application circuitry 31 electrically coupled to the touch sampling flag generation circuitry 11, and configured to control the quantity of fluctuations of the data voltage to be smaller than the fluctuation threshold within the display period, and provide the fluctuation time point of the data voltage to the touch sampling flag generation circuitry 11.

When the touch unit is an active stylus, the data voltage fluctuation indication signal is the touch sampling flag, so as to avoid the data voltage fluctuation frequency point and prevent the influence caused by the noise. Different report rates are provided for different active stylus protocols. For example, the report rate is 240 Hz, 360 Hz or 266 Hz. Different OLED display panels have different refresh rates, e.g., 60 Hz, 90 Hz or 120 Hz. A signal associated with the fluctuation of the data voltage is provided to the TIC as the touch sampling flag, and a sampling operation is performed after the fluctuation of the data voltage, so as to avoid the large touch noise frequency point, thereby to improve the touch SNR and meet the requirement on an active stylus application.

The following description will be given when the display panel is an OLED display panel having a refresh rate of 60 Hz, an HPP active stylus is used and Vsync is taken as the touch sampling flag.

The refresh rate of the OLED display panel is 60 Hz, so an image on the display panel is refreshed 60 times per second. A report rate of the active stylus is 360 Hz, so the TIC reports coordinates 360 times per second. The TIC extracts discrete signals from continuous signals collected per second so as to sample touch information about the active stylus.

When the refresh rate of the OLED display panel is 60 Hz and the report rate of the active stylus is 360 Hz, the active stylus reports data for 6 times each time when a frame is refreshed by the OLED display panel. A time for refreshing one frame is 16.7 ms, dotting time periods are 2 ms, 1.3 ms, 1.2 ms, 2 ms, 1.3 ms and 1.2 ms respectively, and a sampling operation is performed within each dotting time period for 0.4 ms, i.e., the sampling operation needs to be performed within the dotting time period.

Figure 6:
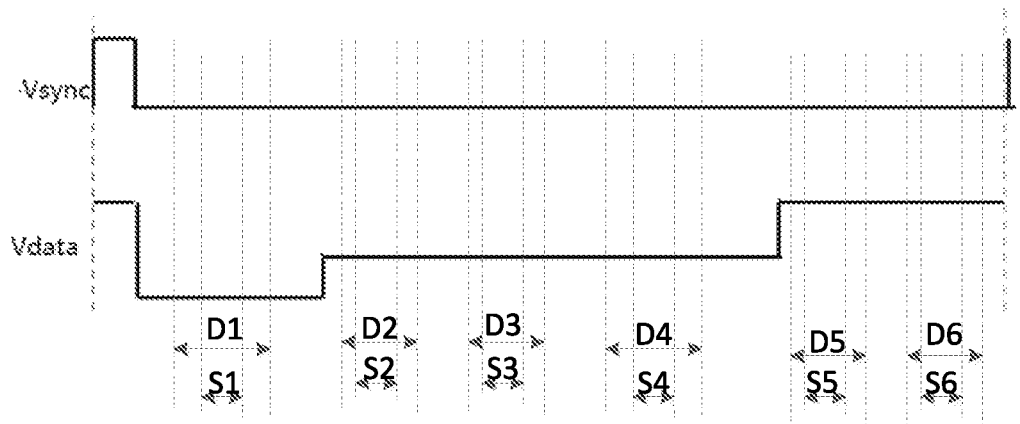
FIG. 6 is a sequence diagram of the touch sampling control module according to one embodiment of the present disclosure.

When one frame is refreshed by the OLED display panel and the pixel circuitries in U+M+V rows are scanned (U, M and V are all positive integers), a scanning time Ta for each row is 16.7/(U+M+V). In this process, there are three fluctuations of data voltage. As shown in FIG. 6, a time for a first fluctuation of data voltage is 2Ta, a time for a second fluctuation of data voltage is (U+1)Ta, and a time for a third fluctuation of data voltage is (U+M+1)Ta. Vsync is used as the touch sampling flag of the TIC, so as to match the fluctuation time of the data voltage with the touch sampling time of the active stylus, and enable the touch sampling time of the active stylus not to overlap with the fluctuation time of the data voltage.

In FIG. 6, Vdata is the data voltage.

In FIG. 6, D1 represents a first dotting time period, D2 represents a second dotting time period, D3 represents a third dotting time period, D4 represents a fourth dotting time period, D5 represents a fifth dotting time period, and D6 represents a sixth dotting time period. Each dotting time period does not overlap with the three fluctuation times of data voltage.

S1 represents a first sampling time period, S2 represents a second sampling time period, S3 represents a third sampling time period, S4 represents a fourth sampling time period, S5 represents a fifth sampling time period, and S6 represents a sixth sampling time period. The touch sampling operation is performed within the first sampling time period S1, the second sampling time period S2, the third sampling time period S3, the fourth sampling time period S4, the fifth sampling time period S5 and the sixth sampling time period S6.

Figure 7:
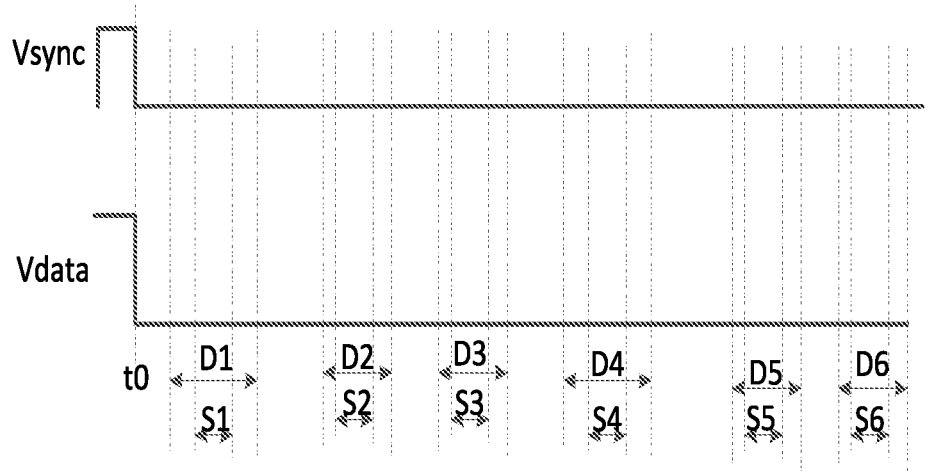
FIG. 7 is another sequence diagram of the touch sampling control module according to one embodiment of the present disclosure.

As shown in FIG. 7, the touch sampling time is located after the fluctuation time point of the data voltage.

In FIG. 7, t0 represents the fluctuation time point of the data voltage, and the first sampling time period S1, the second sampling time period S2, the third sampling time period S3, the fourth sampling time period S4, the fifth sampling time period S5 and the sixth sampling time period S6 are located after the fluctuation time point t0 of the data voltage.

The touch sampling operation is performed within the first sampling time period S1, the second sampling time period S2, the third sampling time period S3, the fourth sampling time period S4, the fifth sampling time period S5 and the sixth sampling time period S6, i.e., the touch sampling time is included in each sampling time period.

A start time point of each sampling time period and the fluctuation time point of the data voltage are greater than the scanning time for one row, and the scanning time for one row is equal to Tz/N, wherein Tz represents one frame, and N represents the total quantity of rows of pixel circuitries in the display touch device.

In FIG. 7, D1 represents a first dotting time period, D2 represents a second dotting time period, D3 represents a third dotting time period, D4 represents a fourth dotting time period, D5 represents a fifth dotting time period, and D6 represents a sixth dotting time period.

Figure 8:
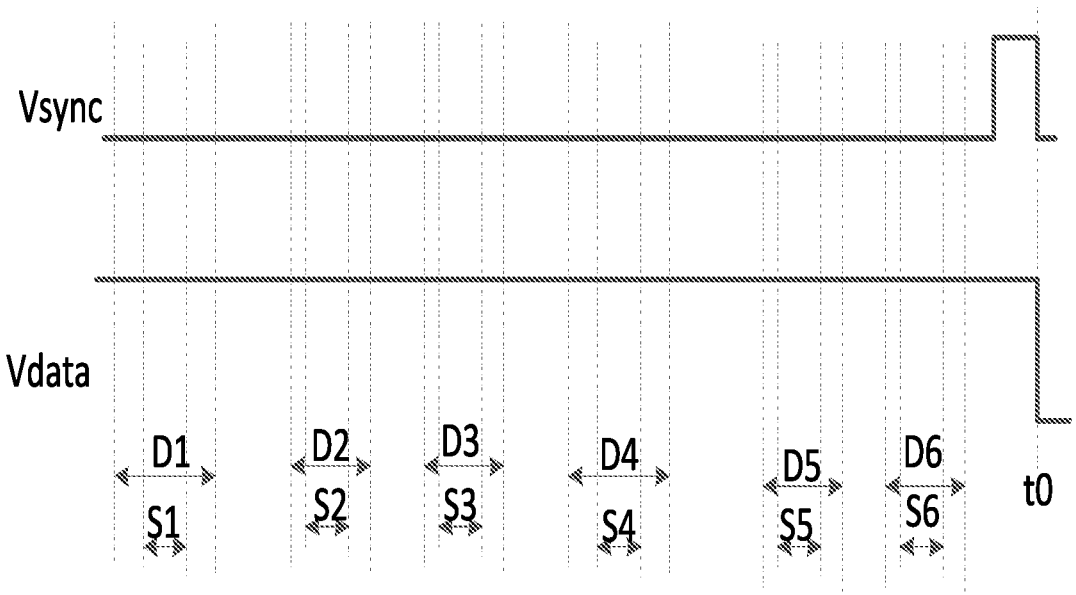
FIG. 8 is yet another sequence diagram of the touch sampling control module according to one embodiment of the present disclosure.

As shown in FIG. 8, the touch sampling time is located before the fluctuation time point of the data voltage.

In FIG. 8, t0 represents the fluctuation time point of the data voltage, and the first sampling time period S1, the second sampling time period S2, the third sampling time period S3, the fourth sampling time period S4, the fifth sampling time period S5 and the sixth sampling time period S6 are located after the fluctuation time point t0 of the data voltage.

The touch sampling operation is performed within the first sampling time period S1, the second sampling time period S2, the third sampling time period S3, the fourth sampling time period S4, the fifth sampling time period S5 and the sixth sampling time period S6, i.e., the touch sampling time is included in each sampling time period.

An end time point of each sampling time period and the fluctuation time point of the data voltage are greater than the scanning time for one row, and the scanning time for one row is equal to Tz/N, where Tz represents one frame, and N represents the total quantity of rows of pixel circuitries in the display touch device.

In FIG. 8, D1 represents a first dotting time period, D2 represents a second dotting time period, D3 represents a third dotting time period, D4 represents a fourth dotting time period, D5 represents a fifth dotting time period, and D6 represents a sixth dotting time period.

In the embodiments of the present disclosure, the quantity of fluctuations of the data voltage is reduced so as to prevent the occurrence of any interference caused by the display operation on the touch sampling operation.

Figure 9:
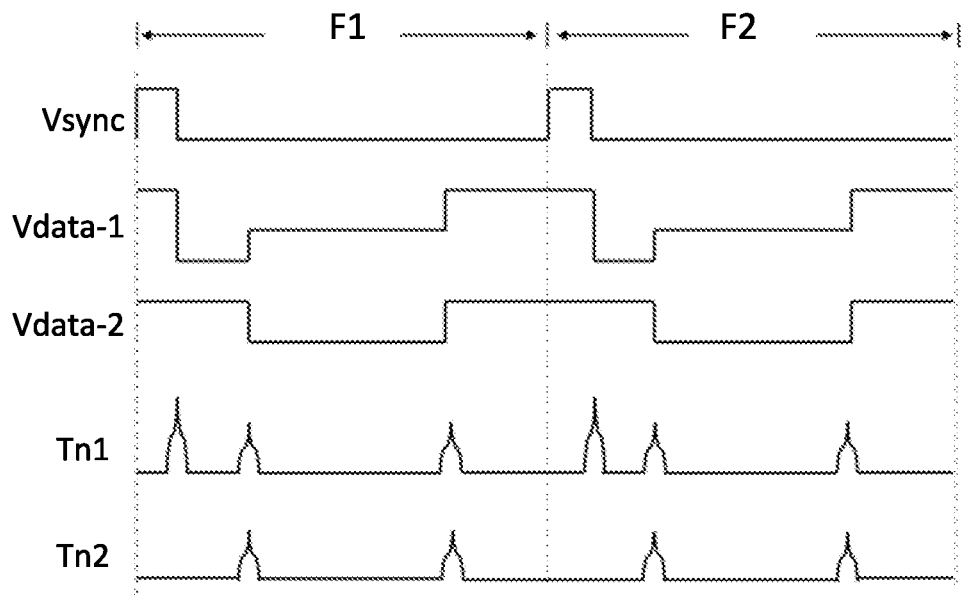
FIG. 9 is a waveform diagram of a data voltage before improvement, a data voltage after improvement, a noise signal before improvement and a noise signal after improvement.

In FIG. 9, Vdata-1 represents a data voltage before improvement, Vdata-2 represents a data voltage after improvement, F1 is a first frame, F2 is a second frame, Tn1 is a noise signal before improvement, and Tn2 is a noise signal after improvement.

As shown in FIG. 9, before improvement, after the rising edge of the frame synchronization signal Vsync, a voltage value of the data voltage is a first voltage value Va (the data voltage is stored in a register). After scanning the pixel circuitries in a second row, the voltage value of the data voltage decreases from the first voltage value to a second voltage value Vb. After scanning the pixel circuitries in a $(U+1)^{th}$ row, the voltage value of the data voltage is Vc. After scanning the pixel circuitries in a $(U+M+1)^{th}$ row, the voltage value of the data voltage increases to the first voltage value Va. In other words, before improvement, the voltage value of the data voltage fluctuates three times within one frame, and there are three large noises within one frame.

Through improvement, after the rising edge of the frame synchronization signal Vsync, the voltage value of the data voltage is the first voltage value Va. After scanning the pixel circuitries in the $(U+1)^{th}$ row, the voltage value of the data voltage is Vc. After scanning the pixel circuitries in the $(U+M+1)^{th}$ row, the voltage value of the data voltage increases to the first voltage value Va. In other words, through improvement, the voltage value of the data voltage fluctuates twice within one frame, and there are two large noises within one frame.

Based on the above, through reducing the quantity of fluctuations of the data voltage within one frame, it is able to reduce the touch noise.

In FIG. 10, Vdata-1 represents a data voltage before improvement, Vdata-2 represents a data voltage after improvement, F1 represents a first frame, F2 represents a second frame time, Tn1 represents a noise signal before improvement, and Tn2 represents a noise signal after improvement.

As shown in FIG. 10, before improvement, after the rising edge of the frame synchronization signal Vsync, a voltage value of the data voltage is a first voltage value Va (the data voltage is stored in a register). After scanning the pixel circuitries in a second row, the voltage value of the data voltage decreases from the first voltage value to a second voltage value Vb. After scanning the pixel circuitries in a $(U+1)^{th}$ row, the voltage value of the data voltage is a third voltage value Vc. After scanning the pixel circuitries in a $(U+M+1)^{th}$ row, the voltage value of the data voltage increases to the first voltage value Va. In other words, before improvement, the voltage value of the data voltage fluctuates three times within one frame, and there are three large noises within one frame.

Through improvement, after the rising edge of the frame synchronization signal Vsync, the voltage value of the data voltage is the first voltage value Va. After scanning the pixel circuitries in the second row, the voltage value of the data voltage is Vc. After scanning the pixel circuitries in the $(U+1)^{th}$ row, the voltage value of the data voltage is Va. Through improvement, the voltage value of the data voltage fluctuates twice within one frame, and there are two large noises within one frame.

Based on the above, through reducing the quantity of fluctuations of the data voltage within one frame, it is able to reduce the touch noises.

The present disclosure further provides in some embodiments a touch sampling control method for a display touch device. The display touch device includes a touch display panel, and a touch sampling control module includes a touch sampling flag generation circuitry and a sampling time control circuitry. As shown in FIG. 11, the touch sampling control method includes: S91 of generating, by the touch sampling flag generation circuitry, a touch sampling flag in accordance with a fluctuation time point of a data voltage applied to the touch display panel; and S92 of controlling, by the sampling time control circuitry, a touch sampling time in accordance with the touch sampling flag so that the touch sampling time is different from the fluctuation time point of the data voltage. The data voltage fluctuates when an absolute value of a voltage change of the data voltage is larger than a voltage change threshold.

According to the method in the embodiments of the present disclosure, the touch sampling flag generation circuitry generates the touch sampling flag in accordance with the fluctuation time point of the data voltage applied to the touch display panel, and the sampling time control circuitry controls the touch sampling time in accordance with the touch sampling flag so that the touch sampling time is different from the fluctuation time point of the data voltage. As a result, it is able to reduce a noise caused when the voltage fluctuation of the data voltage is coupled to a touch sensor, achieve a normal touch operation through differentiating a touch signal from a display noise during the touch driving, and perform the touch sampling with avoiding a large touch noise frequency point, thereby to improve a touch SNR and meet the requirement on an active stylus application.

In a possible embodiment of the present disclosure, the controlling, by the sampling time control circuitry, the touch sampling time in accordance with the touch sampling flag so that the touch sampling time is different from the fluctuation time point of the data voltage, includes controlling, by the sampling time control circuitry, the touch sampling time to be located after the fluctuation time point of the data voltage and controlling a time interval between the touch sampling time and the fluctuation time point of the data voltage to be greater than a time threshold in accordance with the touch sampling flag.

In the embodiments of the present disclosure, the touch sampling time is located after the fluctuation time point of the data voltage, and the time interval between the touch sampling time and the fluctuation time point of the data voltage is greater than the time threshold.

In a possible embodiment of the present disclosure, the controlling, by the sampling time control circuitry, the touch sampling time in accordance with the touch sampling flag so that the touch sampling time is different from the fluctuation time point of the data voltage includes controlling, by the sampling time control circuitry, the touch sampling time to be located before the fluctuation time point of the data voltage and controlling a time interval between the touch sampling time and the fluctuation time point of the data voltage to be greater than a time threshold in accordance with the touch sampling flag.

In the embodiments of the present disclosure, the touch sampling time is located before the fluctuation time point of the data voltage, and the time interval between the touch sampling time and the fluctuation time point of the data voltage is greater than the time threshold.

In a possible embodiment of the present disclosure, the time threshold is Tz/N, where Tz represents one frame, and N represents the total quantity of rows of pixel circuitries in the display touch device.

During the implementation, the time threshold is also greater than Tz/N.

In a possible embodiment of the present disclosure, the display touch device further includes a display driving integrated circuitry, the generating, by the touch sampling flag generation circuitry, the touch sampling flag in accordance with the fluctuation time point of the data voltage applied to the touch display panel includes receiving, by the touch sampling flag generation circuitry, a data voltage fluctuation indication signal from the display driving integrated circuitry and setting the data voltage fluctuation indication signal as the touch sampling flag, and the data voltage fluctuation indication signal indicates the fluctuation time point of the data voltage.

In a possible embodiment of the present disclosure, the display touch device further includes a display driving integrated circuitry, and the touch sampling flag generation circuitry includes a conversion sub-circuitry and a clock memory. The generating, by the touch sampling flag generation circuitry, the touch sampling flag in accordance with the fluctuation time point of the data voltage applied to the touch display panel includes receiving, by the conversion sub-circuitry, a data voltage fluctuation indication signal from the display driving integrated circuitry, converting the data voltage fluctuation indication signal into a corresponding timing sequence signal, and providing the timing sequence signal to the clock memory, the data voltage fluctuation indication signal indicates the fluctuation time point of the data voltage, the clock memory is configured to store therein the timing sequence signal, and the touch sampling flag is the timing sequence signal.

In a possible embodiment of the present disclosure, the data voltage fluctuation indication signal is a frame synchronization signal or a row synchronization signal.

In a possible embodiment of the present disclosure, the touch sampling control module further includes a data voltage application circuitry, and the touch sampling control method further includes controlling, by the data voltage application circuitry, the quantity of fluctuations of the data voltage to be smaller than a fluctuation threshold within a display period.

The present disclosure further provides in some embodiments a display touch device which includes the above-mentioned touch sampling control module.

The display touch device further includes a touch display panel and a data voltage application circuitry, and the data voltage application circuitry is configured to apply a data voltage to a pixel circuitry in the touch display panel. The touch sampling flag providing module is electrically coupled to the data voltage application circuitry, and configured to generate a touch sampling flag in accordance with a fluctuation time point of the data voltage.

Figure 12:
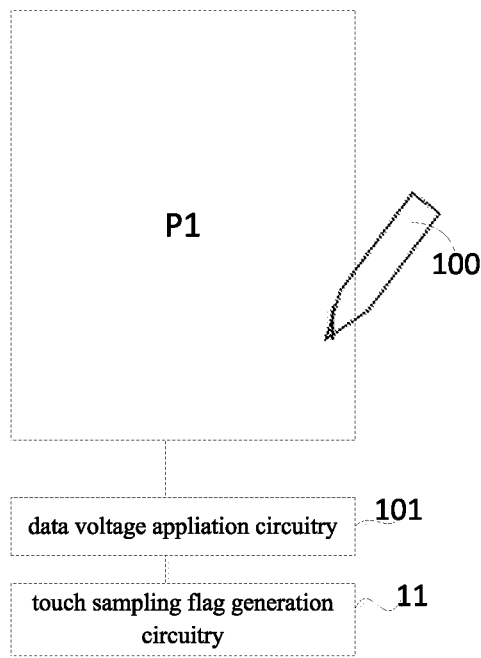
FIG. 12 is a schematic view showing a display touch device according to one embodiment of the present disclosure.

As shown in FIG. 12, when the touch unit is an active stylus, the display touch device further includes the active stylus 100, a touch display panel P1 and a data voltage application circuitry 101. The data voltage application circuitry 101 is configured to apply a data voltage to a pixel circuitry in the touch display panel P1. The touch sampling flag generation circuitry 11 in the touch sampling control module is electrically coupled to the data voltage application circuitry 101 and configured to generate a touch sampling flag in accordance with the fluctuation time point of the data voltage. The active stylus 100 is configured to be in contact with a touch display surface of the touch display panel P1.

In at least one embodiment of the present disclosure, the display touch device includes a source electrode driver, and the data voltage application circuitry is integrated in the source electrode driver.

During the implementation, the data voltage application circuitry is integrated in the source electrode driver.

Figure 13:
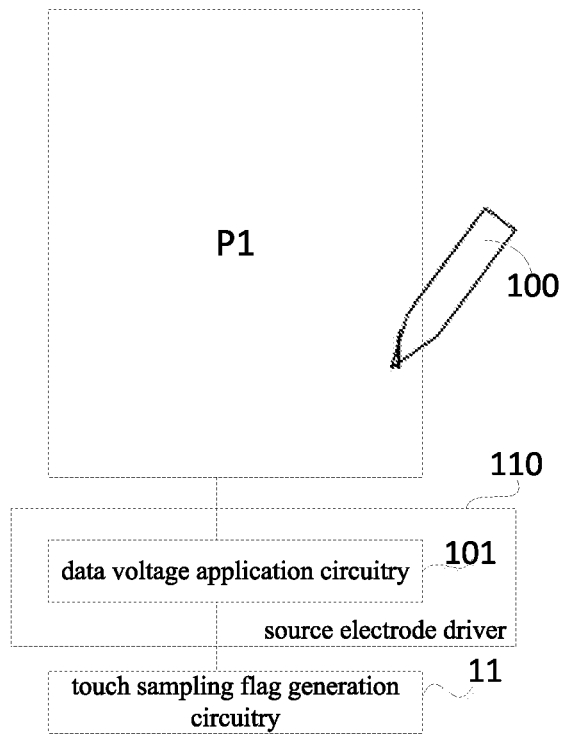
FIG. 13 is another schematic view showing the display touch device according to one embodiment of the present disclosure.

As shown in FIG. 13, on the basis of FIG. 12, the display touch device further includes a source electrode driver 110, and the data voltage application circuitry 101 is integrated in the source electrode driver 110.

In at least one embodiment of the present disclosure, the display touch device further includes a touch integrated circuitry, and the touch sampling flag generation circuitry and the sampling time control circuitry are integrated in the touch integrated circuitry.

The display touch device further includes a display driving integrated circuitry electrically coupled to the data voltage application circuitry, and configured to generate a data voltage fluctuation indication signal in accordance with a data voltage applied by the data voltage application circuitry, and provide the data voltage fluctuation indication signal to the touch sampling flag generation circuitry. The data voltage fluctuation indication signal indicates the fluctuation time point of the data voltage. The touch sampling flag generation circuitry is configured to set the data voltage fluctuation indication signal as the touch sampling flag.

During the implementation, the display touch device further includes the display driving integrated circuitry configured to generate the data voltage fluctuation indication signal in accordance with the data voltage, and the touch sampling flag generation circuitry sets the data voltage fluctuation indication signal as the touch sampling flag.

Figure 14:
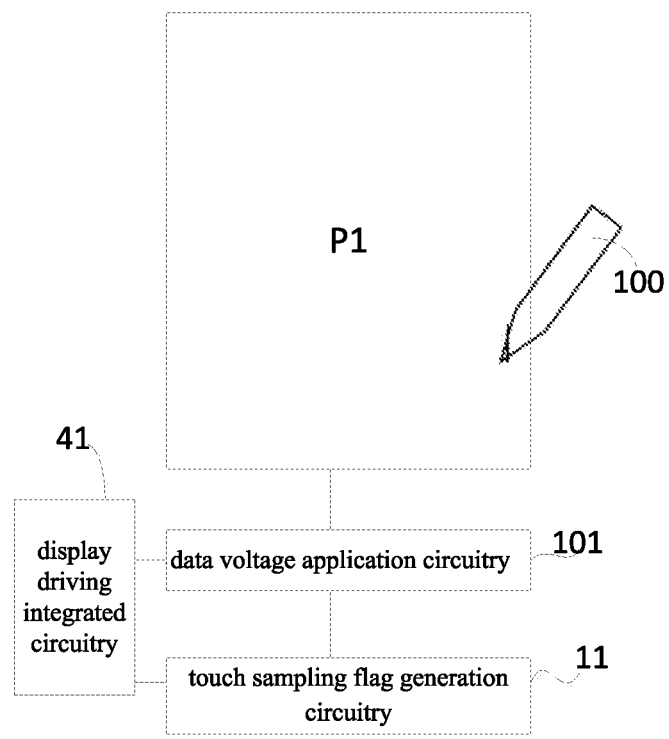
FIG. 14 is yet another schematic view showing the display touch device according to one embodiment of the present disclosure.

As shown in FIG. 14, on the basis of FIG. 12, the display touch device further includes a display driving integrated circuitry 41 electrically coupled to the data voltage application circuitry 101 and the touch sampling flag generation circuitry 11, and configured to generate a data voltage fluctuation indication signal in accordance with the data voltage applied by the data voltage application circuitry 101 and provide the data voltage fluctuation indication signal to the touch sampling flag generation circuitry 11. The touch sampling flag generation circuitry 11 is configured to set the data voltage fluctuation indication signal as the touch sampling flag.

In at least one embodiment of the present disclosure, the display touch device further includes a display driving integrated circuitry, and the touch sampling flag generation circuitry includes a conversion sub-circuitry and a clock memory. The display driving integrated circuitry is electrically coupled to the data voltage application circuitry, and configured to generate a data voltage fluctuation indication signal in accordance with the data voltage applied by the data voltage application circuitry, and provide the data voltage fluctuation indication signal to the conversion sub-circuitry. The conversion sub-circuitry is configured to convert the data voltage fluctuation indication signal into a corresponding timing sequence signal, and provide the timing sequence signal to the clock memory. The clock memory is configured to store therein the timing sequence signal, and the touch sampling flag is the timing sequence signal.

The display touch device in the embodiments of the present disclosure may be any product or member having a display function, e.g., mobile phone, tablet computer, television, display, laptop computer, digital photo frame or navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch sampling control module for a display touch device, wherein the display touch device comprises a touch display panel, and the touch sampling control module comprises a touch sampling flag generation circuitry and a sampling time control circuitry,
wherein the touch sampling flag generation circuitry is configured to generate a touch sampling flag in accordance with a fluctuation time point of a data voltage applied to the touch display panel, the sampling time control circuitry is configured to control a touch sampling time in accordance with the touch sampling flag so that the touch sampling time is different from the fluctuation time point of the data voltage, and the data voltage fluctuates when an absolute value of a voltage change of the data voltage is larger than a voltage change threshold.

2. The touch sampling control module according to claim 1, wherein the display touch device further comprises a display driving integrated circuitry, the touch sampling flag generation circuitry is configured to receive a data voltage fluctuation indication signal from the display driving integrated circuitry and set the data voltage fluctuation indication signal as the touch sampling flag, and the data voltage fluctuation indication signal indicates the fluctuation time point of the data voltage.

3. The touch sampling control module according to claim 2, wherein the display touch device further comprises a touch integrated circuitry, and the touch sampling flag generation circuitry and the sampling time control circuitry are integrated in the touch integrated circuitry.

4. The touch sampling control module according to claim 1, wherein the display touch device further comprises a display driving integrated circuitry, the touch sampling flag generation circuitry comprises a conversion sub-circuitry and a clock memory, the conversion sub-circuitry is configured to receive a data voltage fluctuation indication signal from the display driving integrated circuitry, convert the data voltage fluctuation indication signal into a corresponding timing sequence signal and provide the timing sequence signal to the clock memory, the data voltage fluctuation indication signal indicates the fluctuation time point of the data voltage, the clock memory is configured to store therein the timing sequence signal, and the touch sampling flag is the timing sequence signal.

5. The touch sampling control module according to claim 4, wherein the display touch device further comprises a touch integrated circuitry, and the sampling time control circuitry is integrated in the touch integrated circuitry.

6. The touch sampling control module according to claim 2, wherein the data voltage fluctuation indication signal is a frame synchronization signal or a row synchronization signal.

7. The touch sampling control module according to claim 1, further comprising a data voltage application circuitry configured to control the quantity of fluctuations of the data voltage to be smaller than a fluctuation threshold within a display period.

8. A touch sampling control method for a display touch device, wherein the display touch device comprises a touch display panel, and a touch sampling control module comprises a touch sampling flag generation circuitry and a sampling time control circuitry, wherein the touch sampling control method comprises:
generating, by the touch sampling flag generation circuitry, a touch sampling flag in accordance with a fluctuation time point of a data voltage applied to the touch display panel; and
controlling, by the sampling time control circuitry, a touch sampling time in accordance with the touch sampling flag so that the touch sampling time is different from the fluctuation time point of the data voltage,
wherein the data voltage fluctuates when an absolute value of a voltage change of the data voltage is larger than a voltage change threshold.

9. The touch sampling control method according to claim 8, wherein the controlling, by the sampling time control circuitry, the touch sampling time in accordance with the touch sampling flag so that the touch sampling time is different from the fluctuation time point of the data voltage, comprises controlling, by the sampling time control circuitry, the touch sampling time to be located after the fluctuation time point of the data voltage and controlling a time interval between the touch sampling time and the fluctuation time point of the data voltage to be greater than a time threshold in accordance with the touch sampling flag.

10. The touch sampling control method according to claim 8, wherein the controlling, by the sampling time control circuitry, the touch sampling time in accordance with the touch sampling flag so that the touch sampling time is different from the fluctuation time point of the data voltage comprises controlling, by the sampling time control circuitry, the touch sampling time to be located before the fluctuation time point of the data voltage and controlling a time interval between the touch sampling time and the fluctuation time point of the data voltage to be greater than a time threshold in accordance with the touch sampling flag.

11. The touch sampling control method according to claim 9, wherein the time threshold is Tz/N, where Tz represents one frame, and N represents the total quantity of rows of pixel circuitries in the display touch device.

12. The touch sampling control method according to claim 8, wherein the display touch device further comprises a display driving integrated circuitry, wherein the generating, by the touch sampling flag generation circuitry, the touch sampling flag in accordance with the fluctuation time point of the data voltage applied to the touch display panel comprises receiving, by the touch sampling flag generation circuitry, a data voltage fluctuation indication signal from the display driving integrated circuitry and setting the data voltage fluctuation indication signal as the touch sampling flag, and the data voltage fluctuation indication signal indicates the fluctuation time point of the data voltage.

13. The touch sampling control method according to claim 8, wherein the display touch device further comprises a display driving integrated circuitry, and the touch sampling flag generation circuitry comprises a conversion sub-circuitry and a clock memory,
wherein the generating, by the touch sampling flag generation circuitry, the touch sampling flag in accordance with the fluctuation time point of the data voltage applied to the touch display panel comprises receiving, by the conversion sub-circuitry, a data voltage fluctuation indication signal from the display driving integrated circuitry, converting the data voltage fluctuation indication signal into a corresponding timing sequence signal, and providing the timing sequence signal to the clock memory, the data voltage fluctuation indication signal indicates the fluctuation time point of the data voltage, the clock memory is configured to store therein the timing sequence signal, and the touch sampling flag is the timing sequence signal.

14. The touch sampling control method according to claim 12, wherein the data voltage fluctuation indication signal is a frame synchronization signal or a row synchronization signal.

15. The touch sampling control method according to claim 8, wherein the touch sampling control module further comprises a data voltage application circuitry, and the touch sampling control method further comprises controlling, by the data voltage application circuitry, the quantity of fluctuations of the data voltage to be smaller than a fluctuation threshold within a display period.

16. A display touch device, comprising the touch sampling control module according to claim 1.

17. The display touch device according to claim 16, further comprising a touch display panel and a data voltage application circuitry, wherein the data voltage application circuitry is configured to apply a data voltage to a pixel circuitry in the touch display panel, and the touch sampling flag generation circuitry is electrically coupled to the data voltage application circuitry and configured to generate a touch sampling flag in accordance with a fluctuation time point of the data voltage.

18. The display touch device according to claim 17, further comprising a source electrode driver, wherein the data voltage application circuitry is integrated in the source electrode driver.

19. The display touch device according to claim 17, further comprising a display driving integrated circuitry electrically coupled to the data voltage application circuitry and configured to generate a data voltage fluctuation indication signal in accordance with the data voltage applied by the data voltage application circuitry and provide the data voltage fluctuation indication signal to the touch sampling flag generation circuitry, wherein the data voltage fluctuation indication signal indicates the fluctuation time point of the data voltage, and the touch sampling flag generation circuitry is configured to set the data voltage fluctuation indication signal as the touch sampling flag.

20. The display touch device according to claim 17, further comprising a display driving integrated circuitry, wherein the touch sampling flag generation circuitry comprises a conversion sub-circuitry and a clock memory, the display driving integrated circuitry is electrically coupled to the data voltage application circuitry and configured to generate a data voltage fluctuation indication signal in accordance with the data voltage applied by the data voltage application circuitry and provide the data voltage fluctuation indication signal to the conversion sub-circuitry, the conversion sub-circuitry is configured to convert the data voltage fluctuation indication signal into a corresponding timing sequence signal and provide the timing sequence signal to the clock memory, the clock memory is configured to store therein the timing sequence signal, and the touch sampling flag is the timing sequence signal.

* * * * *